July 17, 1928.  1,677,201
C. H. OAKLEY
APPARATUS FOR CONTINUOUS TREATMENT OF WORK UNDER PRESSURE
Filed Sept. 11, 1923  4 Sheets-Sheet 2
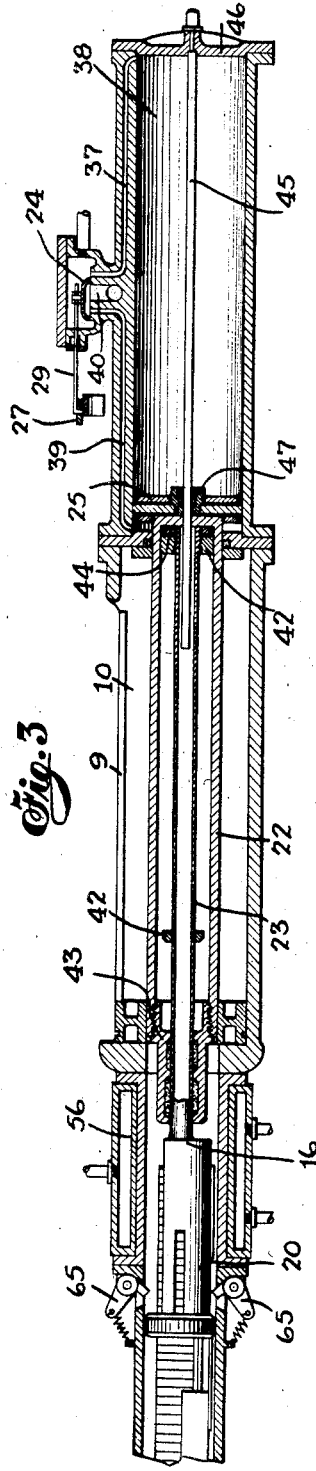
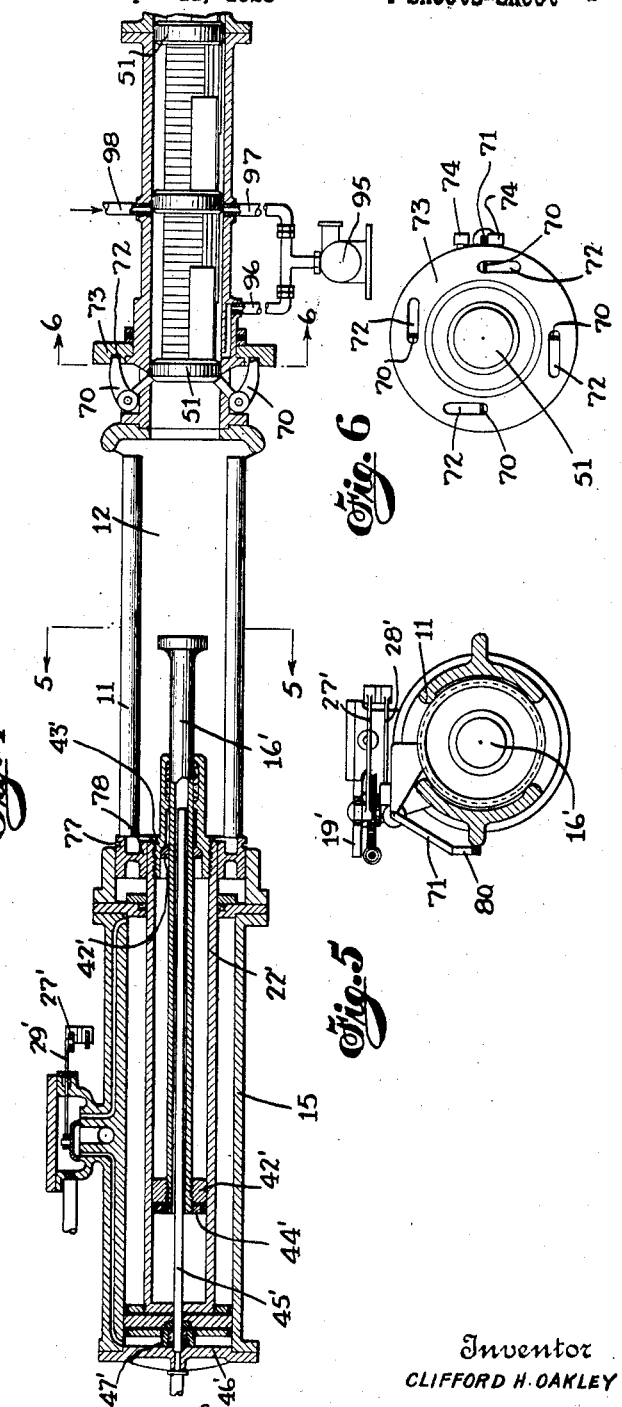
Inventor
CLIFFORD H. OAKLEY
By his Attorneys
Emery Booth Janney & Varney

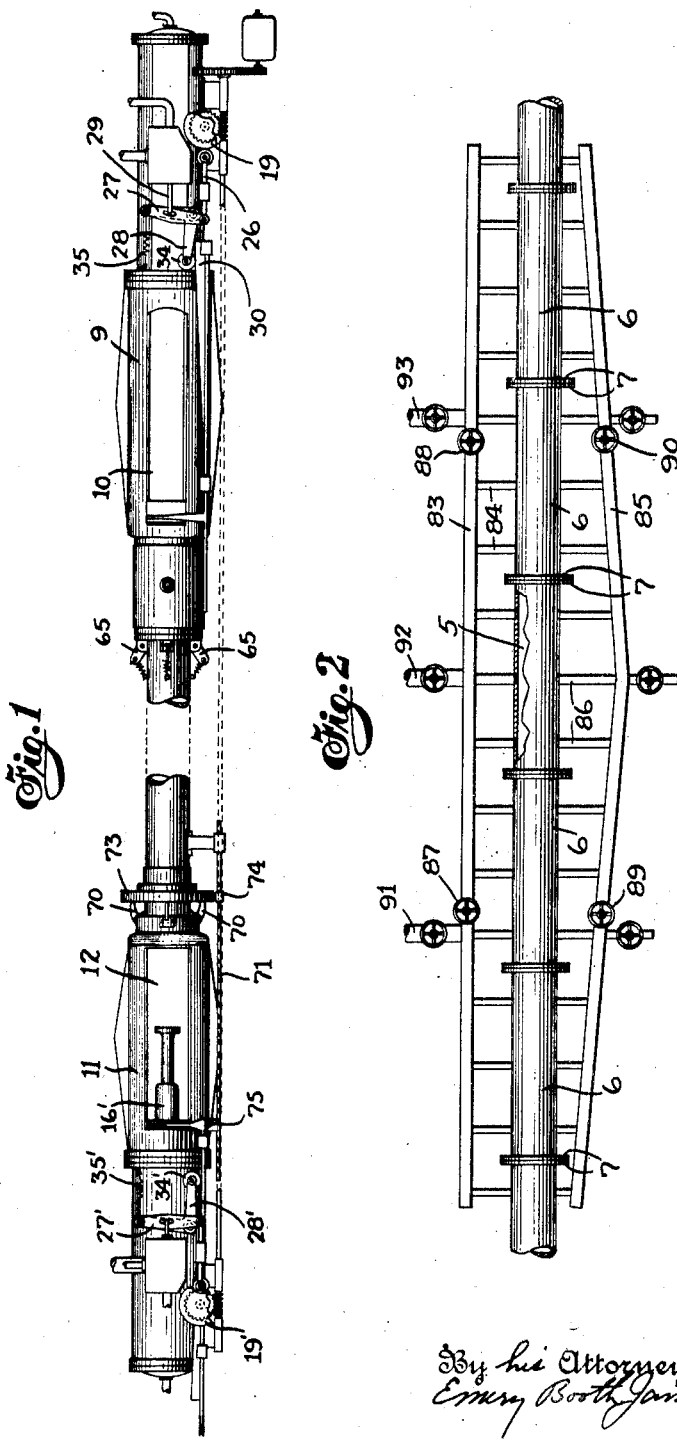

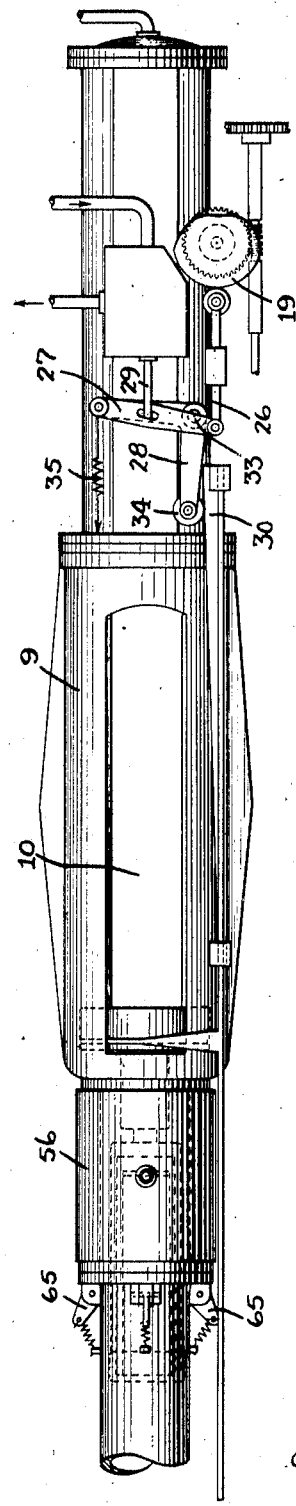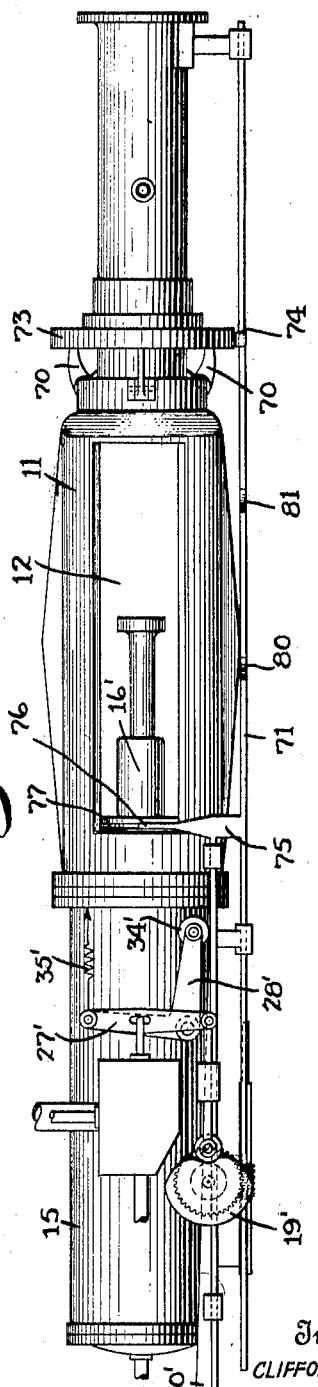

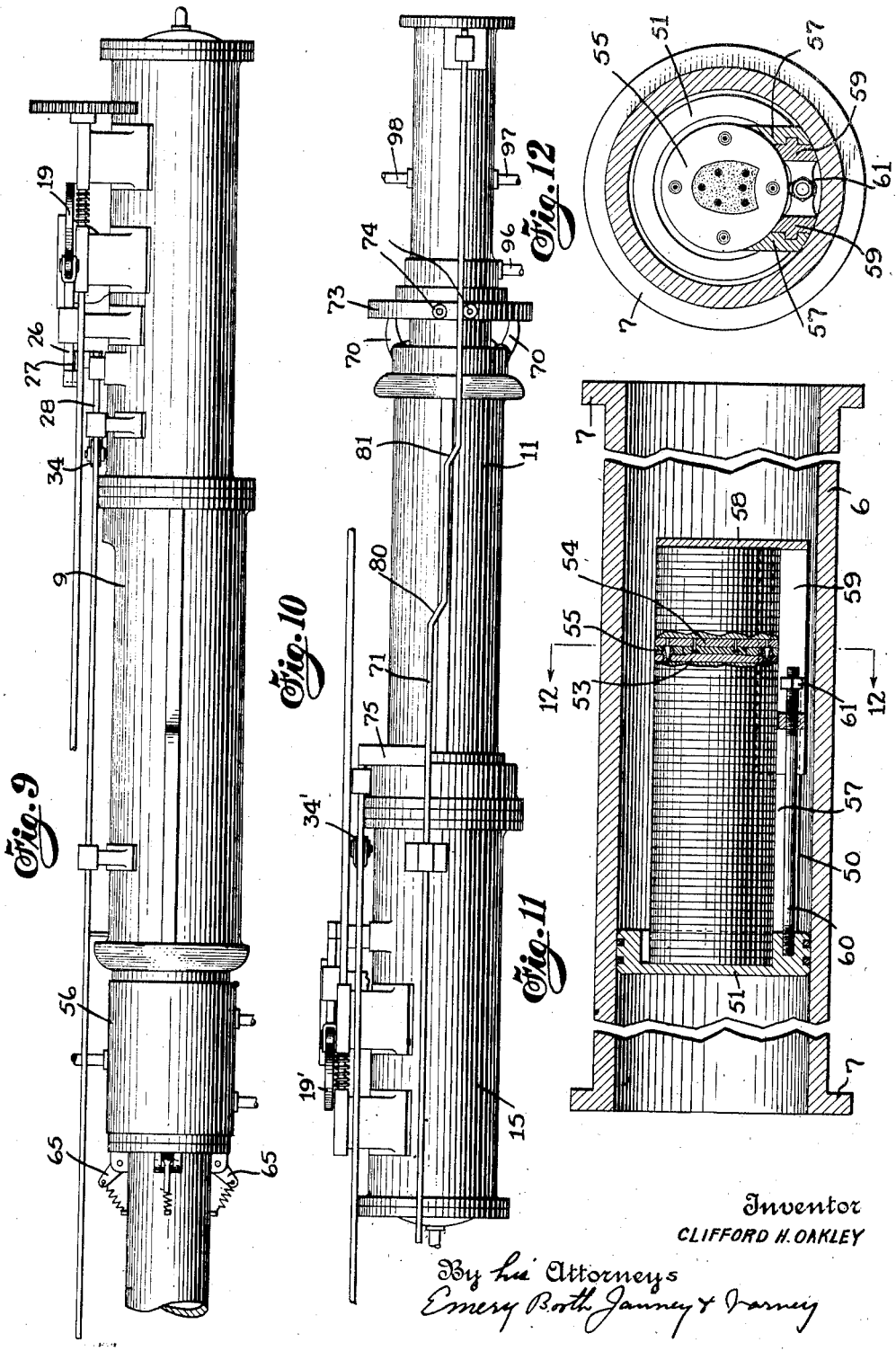

Patented July 17, 1928.

1,677,201

UNITED STATES PATENT OFFICE.

CLIFFORD H. OAKLEY, OF TRENTON, NEW JERSEY.

APPARATUS FOR CONTINUOUS TREATMENT OF WORK UNDER PRESSURE.

Application filed September 11, 1923. Serial No. 662,067.

The invention relates to apparatus for use in the treatment of certain kinds of work wherein it is desirable to maintain pressure upon the work during treatment, and it is more particularly concerned with apparatus which is adapted for so called continuous operation.

The invention has been developed more particularly in connection with apparatus for vulcanizing rubber heels and for convenience will be described in this relation, although many features of the invention can be usefully applied to apparatus for vulcanizing work of entirely different character and to apparatus for use in treatment of the work other than vulcanization.

In the manufacture of rubber heels it is common practice to introduce a number of loaded molds into the heating chamber and after a predetermined time, remove said molds and introduce a fresh supply similarly charged. In this method of operation one set of molds is in the heating chamber being treated while another set of molds is outside being unloaded and recharged. This requires, if the heating chamber is to be maintained in substantially constant use, the provision of at least twice as many molds as are to be treated in the heating chamber at one time.

The molds are relatively expensive and the requirement of such a large number is obviously objectionable. This method of operation is also objectionable in that the molds are kept out of the heating chamber a relatively long time during which they become cooled and must be reheated, thus involving a substantial loss of heat which accomplishes no useful function.

In the manufacture of rubber heels and other articles having considerable thickness of rubber, considerable pressure is required to fully close the molds and maintain them in closed relation during the vulcanizing operation, but a better product is obtained by thus vulcanizing the rubber under substantial compression.

It is furthermore desirable in the manufacture of such articles to partially heat the fresh charge of material before entirely closing the mold and compressing the material. It is an object of the present invention to provide an apparatus wherein a relatively large proportion of the molds required may be at all times undergoing treatment while a relatively small proportion are removed from the treating chamber at any one time for unloading and recharging.

It is also an object of the invention to reduce as far as possible the length of time which any particular mold is removed from the heating chamber, thereby reducing the extent of useless cooling and reheating.

The nature and objects of the invention will be better understood from a description of an illustrative embodiment thereof. For the purpose of such description reference should be had to the accompanying diagrammatic drawings forming a part hereof in which Figure 1 is a plan view showing diagrammatically the charging and discharging sections of a vulcanizing apparatus constructed in accordance with the invention.

Figure 2 is a view in elevation showing the central portion of the same apparatus.

Figure 3 is a central sectional view of the charging apparatus.

Figure 4 is a similar sectional view of the discharging apparatus.

Figure 5 is a transverse sectional view taken on the line 5—5 Figure 4.

Figure 6 is a detail sectional view of the detent operating cam taken on the line 6—6 Figure 4.

Figure 7 is a plan view of the charging apparatus showing the plunger controlling cams.

Figure 8 is a similar view of the discharging apparatus.

Figure 9 is a view in elevation of the charging apparatus.

Figure 10 is a similar view of the discharging apparatus.

Figure 11 is a view partially in section showing the mold carrier in position in a section of the treating chamber.

Figure 12 is a sectional view taken on the line 12—12 Figure 11.

In the illustrative apparatus a treating chamber is provided through which the work passes to be treated, fresh work being fed at one end and finished work being discharged at the opposite end. The arrangement is preferably such that a heating medium, for example steam, can be admitted to the treating chamber but will not escape excessively at either the heating or discharging stations.

The treating chamber 5 may be tubular in form throughout its entire length and is shown as constructed of pipe sections 6 having flanges 7 suitably bolted together. On the feeding or charging end there is connected to the end pipe sections a casting 9 providing a charging chamber 10 open at the top for receiving fresh work. At the discharging end a casting 11 open at the top and bottom provides a discharge chamber 12 facilitating the removal of finished work. Obviously, automatic means for feeding fresh work to the charging chamber and for removing finished work from the discharging chamber may be provided, but this has not been considered desirable in the apparatus herein described and is not shown.

The work is advanced longitudinally through the treating chamber by suitable means arranged to maintain pressure thereon at all times. The means shown comprises a fluid pressure actuated feeding or charging plunger 16 at one end and a similar discharging plunger 16' at the other end. The advance and retraction of the plungers in suitably timed relation is controlled by cams 19, 19'. The cams 19, 19' are actuated synchronously by a shaft extending longitudinally of the apparatus and carrying worms which engage worm wheels rigidly connected to said cams. This shaft may be driven in any suitable manner as by means of a motor, the speed of which can be controlled by a rheostat or any other suitable means. The plungers and their operating cylinders and control valves are substantially duplicates of each other, except that the charging plunger is provided with a cradle or work holder 20 for receiving a fresh charge of work. Corresponding parts of the charging plunger and its operating mechanism on the one hand, and of the discharging plunger and its operating mechanism on the other hand, are given the same reference numbers but those numbers designating the parts of the discharging mechanism are given an exponent to distinguish them.

The charging plunger 16 may be considered as comprising a main plunger 22 which is held under relatively positive control, and a yieldable auxiliary plunger 23 which is carried by and movable relative to the main plunger. The position of the main plunger is controlled by fluid pressure entering through a D slide valve 24 and acting on the head 25. The valve 24 is controlled by the cam 19 through the cam actuated rod 26 connected to floating lever 27 which is pivoted at one end to the bell crank lever 28 and connected at its center by the valve rod 29 to the valve 24. The bell crank lever 28 is in turn controlled by a wedge shaped cam 30 connected to move with the main plunger 22. In the arrangement shown, the bell crank lever 28 which is pivoted at 33 carries a roller 34 which bears against the cam 30 to be actuated thereby. A spring 35 acts to hold the roller 34 in contact with the cam 30. By this arrangement the position of the main plunger is definitely controlled by the cam 19 which upon predetermined movement will cause the valve 24 to open and remain open until the plunger moves to the predetermined position, when, through action of cam 30 and floating lever 27, the valve will be closed. Movement of the valve 24 to the right as shown in Figure 3 opens the port 37 to the pressure chamber 38 and simultaneously opens port 39 to connect it with exhaust port 40. Movement in the opposite direction similarly admits pressure to return the plunger to its retracted position.

The inner auxiliary plunger 23 is reciprocable within the main plunger, its movement in an outward direction being limited by a collar 42 engaging the guide member 43. This auxiliary plunger is yieldably urged forward by a constant fluid pressure which is maintained behind the head 44 through connection with a constant source of fluid pressure. This connection is shown as made through a tube 45 secured in the outer cylinder head 46 and extending through the stuffing box 47 in the plunger head 25. The tube 45 is of sufficient length to accommodate the movement of the main plunger and enters a bore in the inner auxiliary plunger 23 to permit free movement of said auxiliary plunger.

The described arrangement is such that the pressure exerted by the auxiliary plungers tending to close the molds is at all times substantially constant, varying only by an amount equal to the frictional resistance to longitudinal movement between the work and the walls of the treating chamber.

The discharging plunger 16 differs from the charging plunger 16 in that it is formed with a simple head instead of having a work holder 20 to receive fresh work and its control cam 19' differs from the control cam 19 of the charging plunger to give the required motion thereto as will be obvious hereinafter. Otherwise the two plungers and the operating mechanism thereof are similar.

The work may be introduced into the charging chamber and moved forward by the plunger in any suitable manner. In the apparatus illustrated, it is desirable to provide means for closing the charging end of the chamber while the work is being introduced and for closing the discharging end while the work is being discharged. To this end, means is provided for closing the tubular chamber, which means substantially fills said chamber making a substantially fluid tight joint with the walls thereof and is movable longitudinally through the chamber with the work. This means acts in the manner of a piston in a cylinder and moves entirely through the chamber, similar means being provided at suitably spaced intervals and moving with the work.

In the arrangement shown work carriers 50, each having a head 51 fitting within the tubular chamber and forming a substantially fluid tight closure therefor are provided. The apparatus shown is designed for use in vulcanizing rubber heels. Three-part molds are used, each mold comprising two outer face plates 53, 54 and an intermediate ring plate 55, the relation of the plates being determined by suitable dowel pins.

It is desirable to make provision whereby these molds can be introduced into a preliminary heating section of the heating chamber in partially closed relation and later closed under pressure when the charge of rubber has become heated. In the arrangement shown, the molds are carried in the carriers 50, which carriers are made compressible to permit such closing movement. The preliminary heating section is shown as heated by a steam jacket 56.

The carriers together with the molds may be considered, in one aspect, as constituting the work carriers, while in another aspect, the carrier cages may be considered more specifically work carriers in that they receive complete molds.

As shown in Figure 11 each carrier is in the form of a two-part cage, the parts of which are slidably connected. One part of the carrier comprises the head 51 and the longitudinally extending ways 57. The other part comprises an opposite head 58 and a longitudinally extending slide 59 movable in the ways 57. A bolt 60 and nut 61 limits the separating movement of the carrier parts. As shown in Figure 11 the parts are in compressed relation with the molds fully closed but when first introduced into the apparatus the carrier and molds are ordinarily in the extended condition.

In order that the carriers, loaded with molds, may be introduced into the heating chamber or into the preliminary heating section thereof without immediately applying a closing pressure to the molds, the forward end of the charging plunger is formed with the work holder 20, previously mentioned, which is formed to receive the body of the carrier and bear at its forward end against the head 51 as against a shoulder. Upon forward movement of the plunger, the carrier is thus forced into the preheating section of the heating chamber without compressing the molds carried in said carrier. The retaining dogs 65, which constitute means for holding the work against rearward movement through the heating chamber when the discharge plunger only is pressing against the work, are retracted as the carrier head passes but spring inwardly to engage the rear face of the head. These dogs thus serve as an abutment between which and the yieldable auxiliary plunger at the discharge end, the molds in the chamber are held under pressure when the charging plunger is later retracted.

Upon retraction of the charging plunger 16 the carrier just introduced is left in the preheating section of the heating chamber but is not under compression. When the next carrier is similarly forced forward by the charging plunger, the then preheated molds in the previously introduced carrier are closed under pressure and then move forward.

Retaining means in the form of pivoted dogs 70 are provided to bear against the heads 51 of the carriers at the discharge end of the tubular chamber. These dogs are preferably positively controlled as by a cam 71 carried by or movable with the plunger 16'.

As shown, laterally extending arms of the dogs 70 enter slots 72 of the rotatable cam 73 to be controlled thereby. This cam in turn is provided with two rollers 74 between which the longitudinally movable cam rod 71 engages to rotate said cam 73. The cam rod 71 is connected as at 75 to the longitudinally movable cam 30' and also to the main plunger 22' by means of an arm 76 which engages a groove 77 in the head 78 which forms a part of the discharging plunger.

The cam 71 is so designed and the rollers 74 are so spaced that upon forward movement of the plunger 22' and cam 71, one of the rollers 74 will be engaged by the operative portion 80 of the cam 71 to rotate cam 76 and retract the dogs 70. Upon return movement of plunger 22' and of cam 71 moving therewith, the second roller 74 will be engaged by the operative portion 81 of the cam 71 to again rotate the cam 73 and return the dogs 70 to operative position. The time of operation of the dogs 70 is thus such that they will be maintained in retracted position during the movement of the head 51 of the carrier past the same and they will again be moved into head engaging position to engage the head of the next following carrier. By this arrangement the carriers are discharged one by one from the treating chamber while the remaining carriers are held compressed.

In the apparatus shown, steam is admitted as a heating medium to predetermined parts of the heating chamber through suitable ports therein and water of condensation is drained therefrom through suitable ports in the bottom of the chamber. As shown in Figure 2, steam is supplied through a header 83, having connections 84 to the heating chamber at suitable spaced intervals. These connections 84 are close enough to each other so that steam will be admitted between each two successive carrier heads. An exhaust header 85 is suitably connected by leads 86 to a suitable number of exhaust ports to remove the water of condensation from the apparatus.

The arrangement is such that either steam at different temperatures can be admitted to different sections to provide for treating the work successively under different conditions or steam can be admitted to all sections from a common source. When different temperatures are desired in successive sections the valves 87, 88 in the steam header 83 and the valves 89, 90 in the exhaust header 85 are closed and steam is admitted through separate supply pipes as 91, 92, 93 and the water of condensation is exhausted from the different sections of the exhaust conduit separately. Provision can be made in this manner for dividing the chamber into any desired number of sections for treating at different temperatures.

When treatment at one temperature only is desired, the valves in the headers are opened and steam may be admitted through one steam supply pipe. The steam and exhaust connections are suitably spaced from the two ends of the apparatus to insure complete closure of the chamber by the carrier heads at all times during the operation of the device.

In order to prevent the excessive escape of steam into the atmosphere, means is preferably provided for exhausting the steam surrounding the carriers as they advance to discharge position but before they pass out of the closed tubular portion of the apparatus. For this purpose there is shown an exhaust pump 95 connected to suitable ports 96, 97. This portion of the apparatus may be vented if desired at the top as indicated at 98.

The operation of the apparatus is preferably automatically timed by gearing which drives the valve controlling cams at predetermined intervals such that the work will remain in the treating chamber for the necessary length of time. During each cycle of operation, the charging plunger 16 is retracted, a carrier filled with freshly charged molds is set into the work holder 20, the charging plunger 16 then moves forward carrying the carrier filled with fresh work into the preheating section of the heating chamber while simultaneously compressing the molds in the carrier previously positioned in the preheating chamber and advancing said carrier and all others ahead of it through the heating chamber a distance equal to the length of the carrier. When the charging plunger has advanced a predetermined distance the discharging plunger 16′ begins its retractive movement and continues moving at substantially the same speed as the charging plunger until the fresh work is completely introduced and a carrier filled with finished work is discharged. The charging plunger is then held stationary while the discharging plunger continues its retractive movement to free the discharged carrier. During the forward movement of the discharge plunger 16′, the cam 71 operates to retract the dogs 70 and during the retractive movement the same cam operates to throw the dogs 70 inwardly in position to engage the head of the second carrier. The work within the chamber is thus held under compression between the dogs 70 and the plunger 16 during the further retraction of the discharge plunger 16′ and the removal of the finished work. The discharge plunger 16′ then advances into engagement with the work and moves forward taking the pressure of the work off the dogs 70, the work thus being held between the two plungers. As the movement of the discharge plunger continues, the charging plunger begins its retractive movement, the work in the treating chamber all moving rearwardly until the head of the last introduced carrier engages against the stops 65. The movement of the discharge plunger 16′ continues a sufficient distance to secure constant pressure of the auxiliary plunger 23 against the work and then remains stationary while the charging plunger continues its retractive movement.

During the advance movement of the discharge plunger 16′, cam 71 carried by it, operates to again retract the dogs 70 so that these dogs are then in position to permit the exit of a carrier upon the next discharging movement of the plungers. When the charging plunger is fully retracted the apparatus is ready for the insertion of a new charge of fresh work.

The foregoing description is illustrative merely and is not to be construed as defining the limits of the invention as the principles involved may be variously embodied.

I claim:

1. In apparatus of the character described a tubular heating chamber, a series of molds movable therethrough, a series of pistons movable with said molds and arranged to form substantially fluid tight joints with the walls of the tubular chamber, means for forcing said molds and pistons longitudinally through the tubular chamber, and means for admitting a heating medium into said chamber between successive pistons during a portion of their travel through the tubular chamber and for exhausting said pressure prior to the discharge of the molds and pistons.

2. In apparatus of the character described, in combination, a tubular chamber, a series of work carriers each arranged to carry a plurality of molds movable longitudinally therethrough and provided with pistons forming substantially fluid tight joints with the walls of said chamber and means for advancing said carriers longitudinally through said chamber.

3. In apparatus of the character described, in combination, a heating chamber having tubular feeding and discharge portions, a series of work carriers each arranged to carry a plurality of molds and means for moving said carriers continuously through said chamber, said carriers being constructed to form substantially fluid tight connection with the walls of said feeding and discharge portions of the chamber, means for admitting a heating medium to the intermediate portion of said heating chamber and into contact with said work carriers.

4. In apparatus of the character described, in combination, a heating chamber having tubular admission and discharge sections, a series of work carriers movable through said heating chamber and arranged to substantially close the tubular sections, means for introducing fluid under pressure to the intermediate portions of said chamber and means for exhausting said heating medium from the exit or discharge section as the work passes therethrough and means for advancing the work carriers through the chamber step by step.

5. In apparatus of the character described, in combination, a heating chamber, having tubular admission and discharge portions, a series of longitudinally compressible work carriers, means for introducing said work carriers successively into the heating chamber in uncompressed condition for preliminary heating, means for compressing said work carriers and advancing the same through said chamber.

6. In apparatus of the character described, in combination, a heating chamber having tubular admission and discharge portions, a series of longitudinally compressible work carriers, means for introducing said work carriers successively into the heating chamber in uncompressed condition for preliminary heating, said work carriers substantially closing the tubular portions, means for compressing and advancing said carriers step by step through said chamber while maintaining a substantially constant pressure thereon, and means for admitting a heating medium to said chamber.

7. In apparatus of the character described, in combination, a heating chamber having tubular admission and discharge portions, means for admitting a heating fluid to said chamber, and means for exhausting heating fluid from the tubular discharge portions of said chamber.

8. In apparatus of the character described, in combination, a tubular heating chamber having at one end a preliminary heating section and at the opposite end a discharge section, a series of compressible work carriers comprising portions forming a substantially fluid tight closure for said tubular chamber, means for introducing a carrier into said preliminary heating section in uncompressed condition, said means being operative for introducing a second carrier in uncompressed condition to said preliminary heating chamber and for simultaneously compressing and advancing the previously introduced and preliminary heated work carrier.

9. In apparatus of the character described, in combination, a tubular heating chamber, a work feeding plunger at one end of said chamber, an auxiliary plunger carried by said work feeding plunger, means for maintaining a substantially constant pressure upon said auxiliary plunger, means for actuating the feeding plunger to advance work into said chamber, a discharge plunger, an auxiliary plunger carried thereby, and means for maintaining a substantially constant pressure upon said auxiliary plunger.

10. In apparatus of the character described, in combination, a tubular heating chamber, a work feeding plunger at one end of said chamber, means for actuating the feeding plunger to advance work into said chamber, a discharge plunger, means for retaining the work in the heating chamber when the discharge plunger is retracted means for retaining the work in the heating chamber when the feeding plunger is retracted, and means for actuating the work feeding plunger to advance the work into the chamber comprising a cam and a floating valve mechanism.

11. In apparatus of the character described, in combination, a tubular heating chamber, a work feeding plunger at one end of said chamber, means for actuating the feeding plunger to advance work into said chamber, a discharge plunger, means for retaining the work in the heating chamber when the discharge plunger is retracted, means for retaining the work in the heating chamber when the feeding plunger is retracted, means for actuating the work feeding plunger to advance the work into the chamber comprising a cam and a floating valve mechanism, and means for actuating the discharge plunger comprising a cam and floating valve mechanism.

12. In apparatus of the character described, in combination, a tubular heating chamber, a work feeding plunger at one end of said chamber, an auxiliary plunger carried by said work feeding plunger, means for maintaining a substantially constant pressure upon said auxiliary plunger, means for actuating the feeding plunger to advance work into said chamber, a discharge plunger, an auxiliary plunger carried thereby, means for maintaining a substantially constant pressure upon said auxiliary plunger, means for actuating the feeding and discharge plungers to advance fresh work into said tubular chamber and discharge finished work therefrom while maintaining a substantially constant pressure upon the work from both ends of the chamber and for retaining pressure upon said work between one of the auxiliary plungers and one of said retaining means while either the feed plunger is retracted to introduce fresh work in advance thereof, or while the discharge plunger is retracted to permit the withdrawal of finished work.

13. In apparatus of the character described, in combination, a tubular heating chamber, a work feeding plunger at one end of said chamber, means for actuating the feeding plunger to advance work into said chamber, a discharge plunger, means for retaining the work in the heating chamber when the discharge plunger is retracted, means for retaining the work in the heating chamber when the feeding plunger is retracted, means for actuating the work feeding plunger to advance the work into the chamber comprising a cam and a floating valve mechanism, and means for releasing the second mentioned retaining means to permit discharge of work.

14. In apparatus of the character described having a tubular chamber, in combination, a work feeding plunger comprising means for advancing a charge of fresh work into the tubular chamber in uncompressed condition and for simultaneously compressing and advancing previously introduced work through said chamber.

15. In apparatus of the character described having a tubular chamber, in combination, a work introducing plunger comprising at its forward end a carrier receiving cradle, a series of work carriers, each arranged to fit in said cradle and having an enlarged head adapted to substantially close said tubular chamber and arranged to fit against the forward end of said work cradle.

16. In apparatus of the character described, having a tubular chamber, in combination, a work introducing plunger comprising at its forward end a carrier receiving cradle, a series of work carriers, each arranged to fit in said cradle and having an enlarged head adapted to substantially close said tubular chamber and arranged to fit against the forward end of said work cradle, a discharge piston, and a retaining means for holding said work in said chamber, when the discharge plunger is retracted from engagement with the work.

17. In apparatus of the character described, in combination, a work introducing plunger comprising at its forward end a carrier receiving cradle, a series of work carriers, each arranged to fit in said cradle and having an enlarged head adapted to substantially close said tubular chamber and arranged to fit against the forward end of said work cradle, a discharge piston, and a retaining means for holding said work in said chamber, when the discharge plunger is retracted from engagement with the work, means for releasing said retaining means to permit a charge of work to be discharged from the chamber when said discharge plunger is advanced into engagement with the work, and means for simultaneously operating the feed and discharge plungers to advance a fresh charge of work into said chamber and to discharge a finished charge of work from said chamber.

18. In apparatus of the character described, in combination, a tubular heating chamber, a work feeding plunger, at one end of said chamber, means for actuating the feeding plunger to advance work into said chamber, a discharge plunger, means controlling the work feeding plunger comprising a valve, a floating lever for actuating said valve, a cam connected to actuate one end of said lever, and a cam controlled by the movement of the plunger connected to actuate the other end of said lever.

19. In apparatus of the character described, in combination, a treating chamber, work feeding and discharging plungers operating in opposite ends of said chamber, and fluid pressure means controlling the work feeding plunger comprising a cam and a floating valve actuating lever with a cam movable with said plunger controlling one end of said floating lever.

20. In apparatus of the character described, in combination, a treating chamber; a work feeding plunger for introducing work into said chamber; a work discharging plunger for maintaining pressure on the work during discharge of a portion thereof from the chamber; and fluid pressure means for actuating each of said plungers comprising a floating lever, a rotatable cam to control one end of said lever and a reciprocable cam controlled by the plunger to control the other end of said lever.

21. In apparatus of the character described, a tubular treating chamber, a series of expansible work holders movable therethrough and means for maintaining a constant pressure on the work holders and moving the same through the chamber comprising plungers operating against the work and connected to a constant actuating pressure to be actuated at a constant pressure in all positions.

22. In apparatus of the character described, in combination, a tubular heating chamber, a series of work carriers, movable therethrough, comprising means for substantially closing the tubular chamber, means for forcing the work carriers through said chamber, and means for admitting heating medium of different temperatures to different sections of said heating chamber during the progress of the work therethrough.

23. The combination of an elongated horizontal heating chamber adapted to receive a series of groups of articles to be heated, said chamber being open at both ends, means to supply a heating fluid to the chamber between these ends, means at one end of said chamber to force articles progressively through the same comprising a trough shaped carrier arranged to receive a group of articles and to transfer the same into said heating chamber, said means being arranged for thereafter applying pressure to said group of articles longitudinally of the heating chamber substantially as described.

In testimony whereof, I have signed my name to this specification this eighth day of September, 1923.

CLIFFORD H. OAKLEY,